United States Patent
Letscher et al.

(10) Patent No.: US 11,617,292 B2
(45) Date of Patent: Apr. 4, 2023

(54) METHOD FOR CONTROLLING THE OPERATION OF AN ATTACHMENT

(71) Applicant: DEERE & COMPANY, Moline, IL (US)

(72) Inventors: Jens Letscher, Mannheim (DE); Florian Reinmuth, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 468 days.

(21) Appl. No.: 16/837,410

(22) Filed: Apr. 1, 2020

(65) Prior Publication Data

US 2020/0324594 A1    Oct. 15, 2020

(30) Foreign Application Priority Data

Apr. 12, 2019   (DE) .......................... 102019205321.1

(51) Int. Cl.
*A01B 59/06* (2006.01)
*A01B 61/02* (2006.01)
*B60D 1/36* (2006.01)

(52) U.S. Cl.
CPC ............ *A01B 59/066* (2013.01); *A01B 61/02* (2013.01); *B60D 1/36* (2013.01)

(58) Field of Classification Search
CPC .......... A01B 59/066; A01B 61/02; B60D 1/36
See application file for complete search history.

(56) References Cited

U.S. PATENT DOCUMENTS

| 3,691,916 A | * | 9/1972 | Martenson | .......... E01C 19/4873 404/84.2 |
| 3,891,338 A | * | 6/1975 | Smith | ................. E01C 19/4873 404/84.1 |
| 9,555,813 B2 | | 1/2017 | Strano | |
| 2005/0056438 A1 | * | 3/2005 | Nordhoff | .............. E02F 9/2239 172/439 |

FOREIGN PATENT DOCUMENTS

| DE | 2845111 A1 | 4/1980 |
| DE | 3107137 A1 | 9/1982 |
| DE | 3248633 A1 | 7/1984 |
| DE | 3715728 A1 * | 11/1988 |
| DE | 3835812 A1 | 4/1990 |
| DE | 19608140 C1 | 9/1997 |
| DE | 19951840 A1 | 5/2001 |

(Continued)

OTHER PUBLICATIONS

European Search Report issued in counterpart application No. 20168392.7 dated Aug. 19, 2020 (11 pages).

*Primary Examiner* — Jamie L McGowan

(57) ABSTRACT

A method is provided for controlling the operation of an attachment that is coupled to a tractor via a top link and two bottom links of a powerlift. The method includes selecting a point of action from at least one of a pull point as a geometric intersection of imaginary extensions of both bottom links and a pole point as a geometric intersection of imaginary extensions of the top link and a bottom link. The method also includes determining a position of the selected point of action, and signaling the determined position of the point of action by a display unit or adjusting the determined position depending on a comparison with a setpoint setting.

19 Claims, 8 Drawing Sheets

(56) References Cited

FOREIGN PATENT DOCUMENTS

| | | | |
|---|---|---|---|
| DE | 10220998 A1 | 11/2003 | |
| DE | 102015224757 A1 | 6/2017 | |
| EP | 0198405 A2 * | 10/1986 | |
| GB | 2172486 A | 9/1986 | |
| WO | WO-9916295 A1 * | 4/1999 | ........... A01B 59/066 |

* cited by examiner

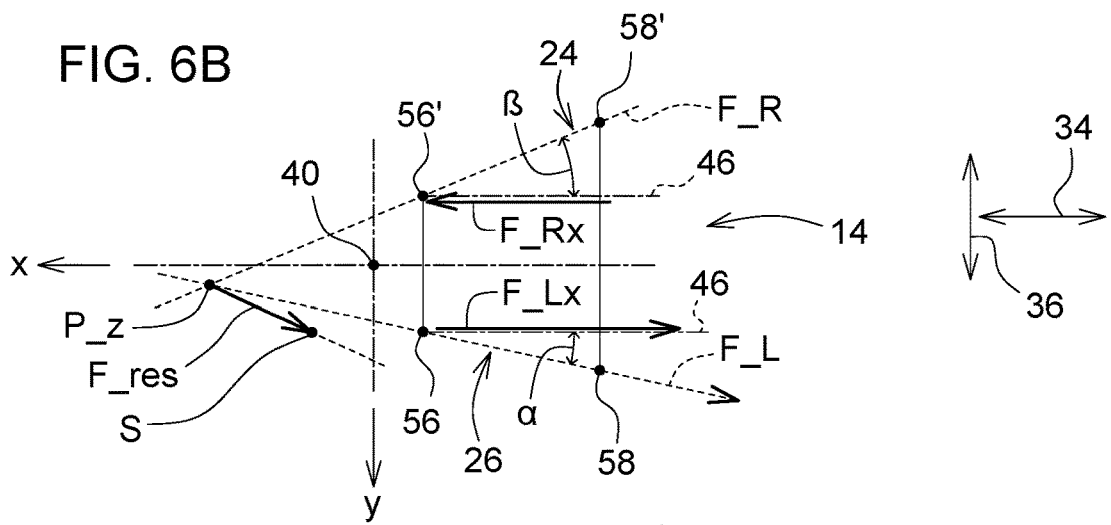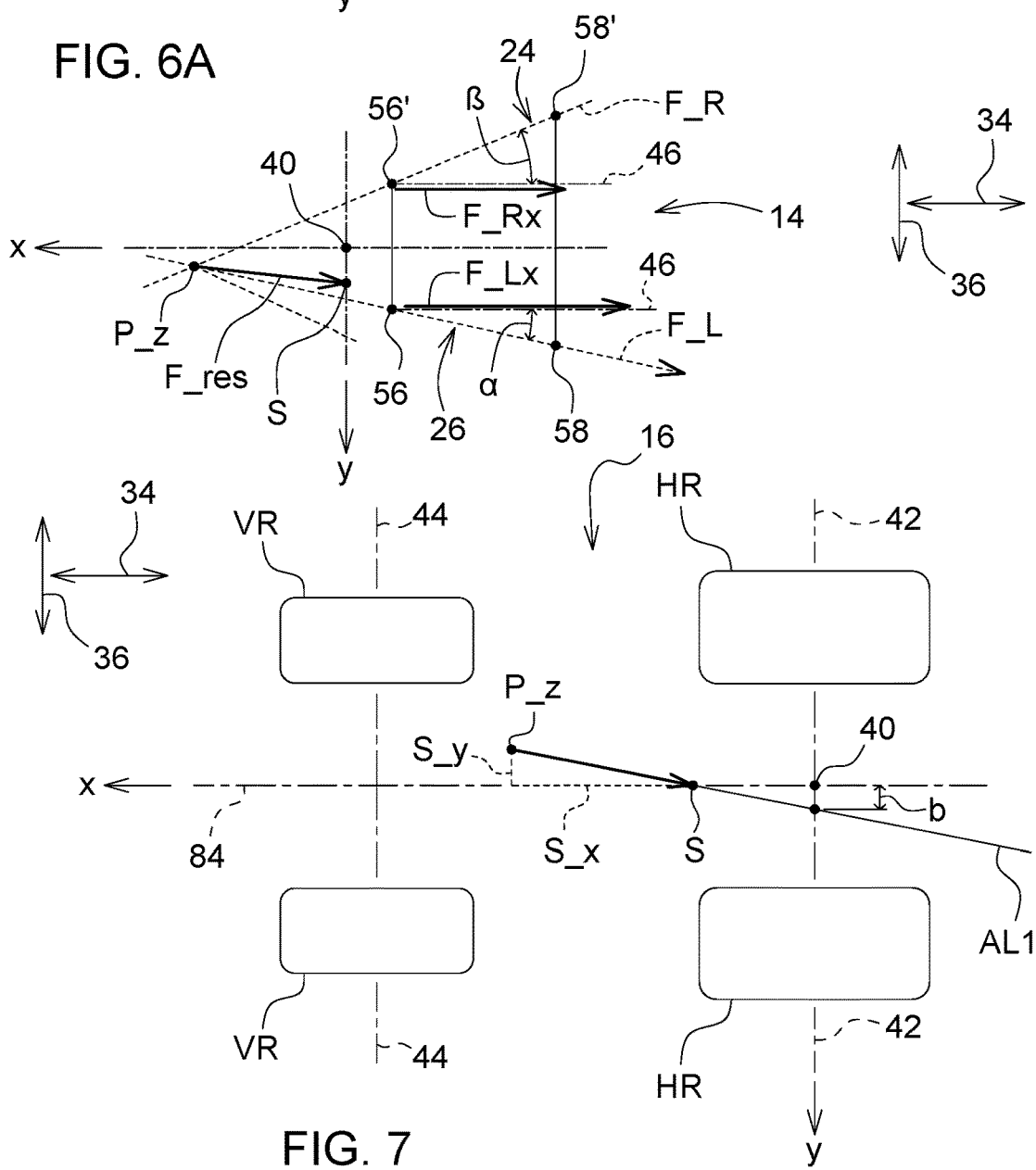

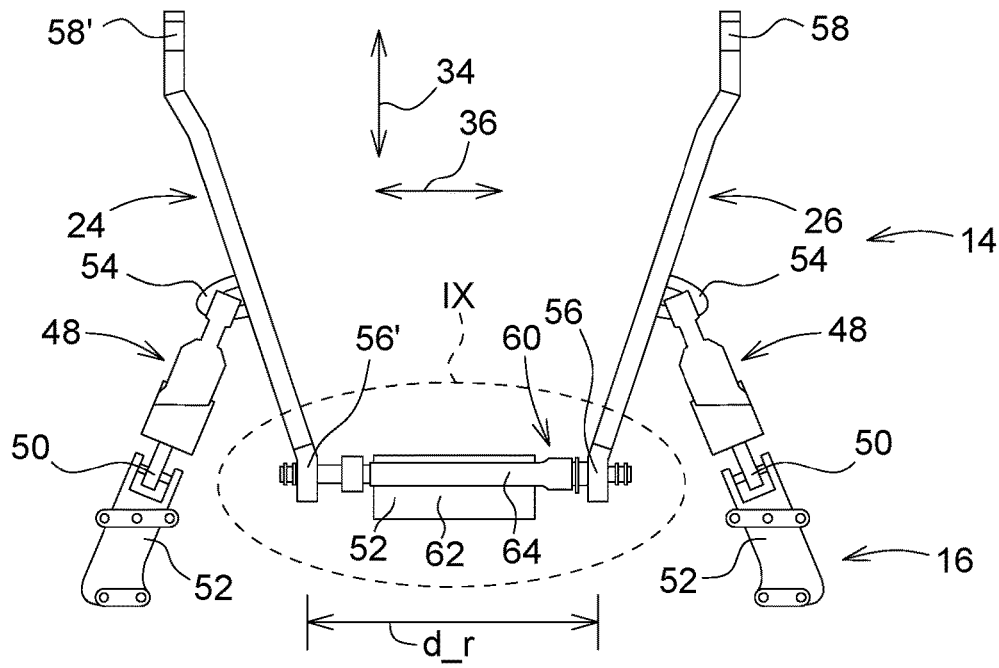
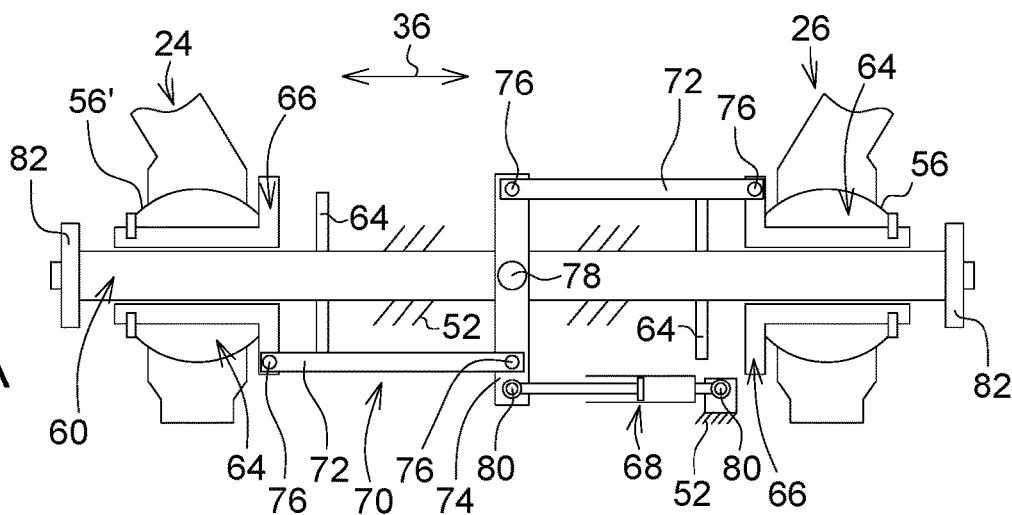
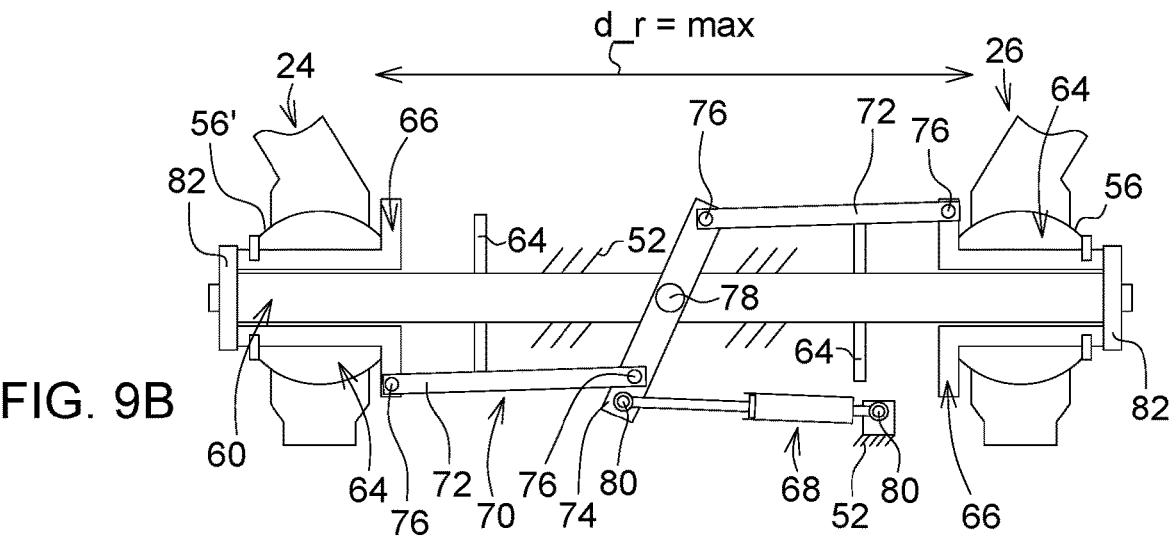

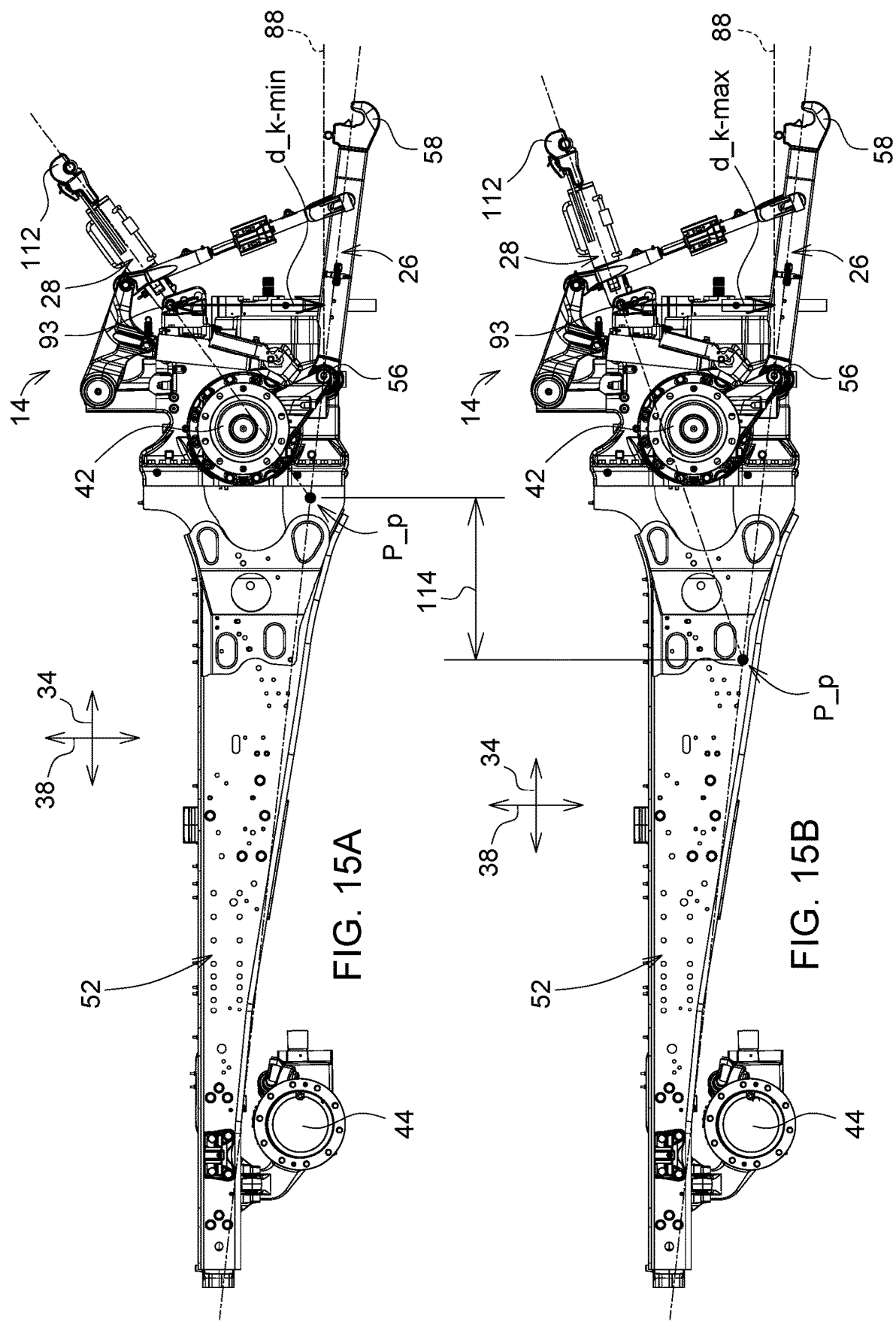

METHOD FOR CONTROLLING THE OPERATION OF AN ATTACHMENT

RELATED APPLICATIONS

This application claims priority to German Patent Application Ser. No. 102019205321.1, filed Apr. 12, 2019, the disclosure of which is hereby incorporated by reference in its entirety.

FIELD OF THE DISCLOSURE

The present disclosure relates to a method for controlling the operation of an attachment that is coupled to a tractor via a top link and two bottom links of a powerlift.

BACKGROUND

From U.S. Pat. No. 9,555,813B2, a method for avoiding instabilities of a vehicle-trailer combination is known. With this method, a yaw angle of the trailer that is compared with a threshold is determined by a camera, for example. Depending on the comparison result, a warning signal can be issued to allow corrective action by an ESP system or the driver. In DE 10 2015 224 757 A1, a device is provided on a tractor to determine the height of towing gear in the form of a plough being towed by the tractor. In the event of deviation from a reference height, a hydraulic actuation unit is activated to pivot the plough.

There is a need for an efficient working operation with an attachment in a simple way.

SUMMARY

In the present disclosure, in the process of controlling the operation of an attachment, the latter is coupled to a tractor via a top link and two bottom links of a powerlift, such as a three-point powerlift. A point of action is selected from at least the following possible geometric points on the tractor: (a) a pull point as a geometric intersection of the imaginary extensions of both bottom links, or (b) a pole point as a geometric intersection of the imaginary extension of the top link and a bottom link or both bottom links.

During the procedure, a position (for example, coordinates within a defined coordinate system) of the selected point of action is determined. For example, the current position thereof can be determined automatically by suitable auxiliary physical variables, measuring positions on the tractor or attachment and a suitably positioned sensor.

A determined position of the selected point of action is signaled to the driver or a user by a display unit (for example, a display screen). The driver or the user then has the option to make adjustments to the attachment or the tractor or the powerlift to adjust the selected point of action. This allows the driver to optimize the position of the point of action based on the signaled current position.

Alternatively or in addition to the signaling of the determined position of the point of action, the determined position of the point of action is adjusted depending on a comparison with a setpoint setting. This allows the selected point of action to be optimized automatically. For example, settings may be made automatically on the attachment or the tractor or the powerlift by suitable control signals or adjustment signals (for example, via a tractor-side bus system or hydraulic actuators or electrical actuators).

As already mentioned, an automated adjustment of the point of action depends on a comparison of the determined position thereof with a setpoint setting. Depending on the comparison result, corresponding adjustment signals can be generated, which are sent to actuators as control signals. By the actuators, the bottom links or the top links of the powerlift or the attachment are adjusted, whereby an adjustment of the current position of the selected point of action can be carried out.

The setpoint setting is generated by the driver (for example, via a user interface) or by a tractor-side control (for example, by a bus system or a control unit).

During the aforementioned comparison, a deviation between the current situation and the setpoint setting is determined first and then the determined deviation is compared with a predetermined deviation threshold value. The automated adjustment of the point of action can be controlled in such a way that an adjustment or optimization of the point of action takes place only if the determined deviation reaches or exceeds the predetermined deviation threshold value.

The described optimization of the respective point of action will make the working mode of the attachment more efficient with little technical effort, be it by optimization on the part of the driver or the user or through automated optimization. This reduces the fuel consumption of the tractor and saves working time. At the same time, a high quality of work of the attachment is supported. In addition, the optimization of the selected point of action acts as an assistance function for the driver or user, so that he is significantly relieved of loading before and during the working operation. Overall, productivity is higher with lower operating costs.

Based on the determined position, an adjustment of the point of action can be used to achieve a working mode behavior of the tractor or the attachment that is desired by the driver or the user in a technically simple manner.

For example, while working (for example, ploughing, with changing ground and topography characteristics such as slopes), an undesirable yawing and correspondingly necessary steering interventions by the driver can be avoided by optimizing the position of the pull point. With a different adjustment of the pull point, for example, a defined side pull of the attachment relative to a furrow wall can be realized during ploughing.

With an adjustment of the pole point, a tractor-trailer combination can also be supported during working operation, for example, during soil cultivation, pulling work or even in the case of a power take off drive. For example, depending on the attachment used, positioning the pole point just behind the front axle of the tractor in the direction of travel can result in a suitable load on the front axle as well as smooth depth behavior. The position of the pole point can be adjusted in such a way that the attachment can be conveniently retracted with little effort. For a particularly effective re-stabilization of guide rollers of various attachments (for example, a cultivator, a disk harrow) the pole point can be adjusted to be in front of the front axle of the tractor in the direction of travel.

The determination of the current position of the point of action also includes the determination of a geometric working line on which this point of action lies, and which connects this point of action to a working point of the attachment. This working line can then also be signaled by a display unit or adjusted depending on a comparison with a setpoint setting. For example, the setpoint setting can comprise a setpoint position of the working line with a setpoint slope or a setpoint angle of the working line relative to a straight reference line or a reference plane.

If the working line connects the pull point as the selected point of action to the working point, the working line lies in a plane spanned by a transverse direction (for example, the y-axis of a coordinate system) and a longitudinal direction (for example, the x-axis of a coordinate system) of the tractor. For example, a determination of this working line can be used to determine whether a yaw moment is applied to the tractor-attachment combination. Such a yaw moment can then be automatically corrected or avoided by a corresponding adjustment of the point of action, depending on a setpoint setting. In one application, no yawing or lateral pull occurs when the determined working line is defined through a coordinate origin (for example, a center point on the rear axle of the tractor) of a coordinate system defined on the tractor.

If the working line connects the pole point as the selected point of action to the working point, the working line lies in a plane spanned by a vertical direction (for example, the z-axis of a coordinate system) and a longitudinal direction (for example, the x-axis of a coordinate system) of the tractor. For example, a determination of this working line can be used to determine whether, for example, during pulling work or in a power take off mode, a slope of this working line and therefore the working operation can be optimized.

In a further embodiment, the setpoint setting has a setpoint position of the selected point of action. For example, the setpoint position can be provided as coordinates with respect to a defined coordinate origin. For example, the position of the point of action relative to the tractor is signaled to the driver or the user on a display unit, while the driver or the user can specify a setpoint position of the point of action (i.e., visible on the display unit) via a user interface.

In another embodiment, the setpoint setting comprises a setpoint position of a working line with a geometric setpoint slope relative to a straight reference line or a reference plane. The straight line connects a setpoint position of the selected starting point to a working point of the attachment. With this embodiment too, the current position of the working line relative to the tractor can be signaled to the driver or the user on a display unit, while the driver or the user can specify the setpoint slope of this straight line (i.e., visible on the display unit) via the user interface. The setpoint slope can also be represented or set by other mathematical-physical variables.

For example, the setpoint slope of a working line connecting the pull point to the working point can be specified in such a way that yawing of or a side-pull on the tractor-trailer-combination is avoided.

In the case of pulling work, a setpoint slope of the working line (here the connection pole point—working point) can be specified as horizontal to slightly rising, while the pole point in the area of the tractor front axle will be as close as possible to the ground. In the case of attachments driven by the power take off, this working line can be advantageously specified as a horizontal to the power take off output with a setpoint position of the pole point in the area of the front powerlift.

The working point or working line will be determined depending on at least one of the following variables: (a) a working length or extension of the attachment along a longitudinal direction of the tractor, (b) a working width or extension of the attachment along a transverse direction of the tractor, (c) a working depth of the attachment along a vertical direction of the tractor, and (d) an effective force component in the longitudinal direction of the tractor that acts on a coupling point of the bottom link facing the tractor.

In the case of a working length and working width of the attachment that are known immediately before the work, the working point or the position thereof can be easily determined by a simple procedure if a static condition of the working point is assumed for simplicity. In this case, the working point is defined as the intersection point, for example, of half (or another fraction) of the working width and half (or another fraction) of the working length on the attachment. Starting from such an intersection point, a longitudinal distance running in the horizontal longitudinal direction of the tractor between this intersection point and a reference point on the tractor (for example, a tractor-side coupling point of a bottom link) can be measured.

Similarly, a transverse distance between this intersection point and the aforementioned reference point can be measured on the tractor in the horizontal transverse direction of the tractor. A working depth running vertically in the tractor's vertical direction can also be measured. For example, this working depth is defined as a vertical distance between a coupling point of the bottom link and an action point of the attachment (for example, a plough body of a plough) in the agricultural soil. The measured data can be entered into an appropriate control system and processed into coordinates with respect to the aforementioned reference point or another reference point (for example, the coordinate origin of a defined coordinate system on the tractor). This allows a working line connecting the pull point to the working point or a working line connecting the pole point to the working point to be determined in a technically simple way.

Assuming a dynamic state of the working point, the working point and also a working line between the pull point and the working point can be determined mathematically simply and sufficiently accurately by taking into account at least one force component effective in the longitudinal direction of the tractor that acts on a coupling point of the bottom link facing the tractor. The force component is measured on both bottom links by suitable means (for example, a load cell). In addition, horizontal reference angles of the bottom links can be measured with respect to a straight reference line running in the longitudinal direction of the tractor. From these force components and reference angles, a resultant force can be calculated which, starting from the pull point, represents the position of the working line connecting the pull point to the working point.

As already mentioned, the position of the selected action point is determined at least depending on the geometric position of the bottom link of links. Here, a reference angle is used that encloses an extension or action line of the individual bottom link with a straight reference line. A determination of the working point or a working line can also be carried out depending on the corresponding reference angles.

The straight reference line is in particular parallel to a longitudinal direction of the tractor. A bottom link action line with a geometric slope can be determined from the respective reference angle. With this data, for example, an intersection point between the two bottom link action lines (and thus the pull point) or an intersection point between a bottom link action line and a top link action line (and thus the pole point) can be determined. The respective reference angle can be determined or calculated in different ways.

In the case of the pull point, for the determination of the respective reference angle, in an embodiment a length measurement is carried out on a variable length side stabilizer (for example, a spring element or a lifting cylinder) of the powerlift. This side stabilizer is linked to a defined point of the bottom link on the one hand and to a defined tractor-side stabilizer coupling point on the other hand. The distance between the stabilizer coupling point and the tractor-side bottom link coupling point is known, so that when the length measurement is carried out on the side stabilizer, the reference angle can be determined by the cosine law. Alternatively, the reference angles for determining the pull point can also be measured directly by arranging suitable rods and rotary potentiometers on the tractor-side bottom link coupling points. Also alternatively, a respective sensor (inertial or tilt sensors, IMU) for the measurement of yaw angles can be arranged on both bottom links. These yaw angles are offset with a yaw angle that is measured by the sensor fixed to the tractor (i.e., inertial or inclination sensors, IMU) as a reference value. This in turn results in the reference angles of both bottom links for the subsequent determination of the pull point. In a further embodiment, the reference angles can also be determined by an optical sensor (for example, one or more camera units) that observe the bottom links.

For example, a bottom link working line and a top link working line can be used to determine the pole point. In one embodiment a measurement of pitch angles is carried out to determine the reference angle between a bottom link working line and a straight reference line (i.e., parallel to the longitudinal direction of the tractor). For this purpose, a suitable sensor (i.e., an inertial sensor or an inclination sensor, IMU) is arranged at least on a bottom link, the measured pitch angle of which is offset with a pitch angle that is measured as a reference value by using the sensor fixed relative to the tractor (again an inertial sensor or an inclination sensor, IMU). Alternatively, the respective reference angle of the bottom link can also be measured, in that, for example, suitable rods and rotary potentiometers are arranged in the area of the tractor-side bottom link coupling points. The top link working line can be provided by determining the top link angle between the top link and a straight reference line (e.g., parallel to the longitudinal direction of the tractor). For this purpose, a sensor (i.e., an inertial sensor or an inclination sensor) may be arranged on the top link.

A coordinate system is defined for a clear determination of the point of action or the current position or even the setpoint position thereof. The coordinate origin or zero point thereof corresponds to a defined reference point, in particular a center point of the rear axle of the tractor. An x-axis, a y-axis and a z-axis intersect at the coordinate origin. The x-axis runs in particular parallel to a longitudinal direction or a vehicle horizontal of the tractor. The y-axis runs in particular parallel to a transverse direction or a vehicle horizontal of the tractor. The z-axis runs in particular parallel to a vertical direction or a vehicle vertical of the tractor. With this coordinate system, the position of the respective point of action, the position of the working point on the attachment as well as the position of a working line connecting the point of action to the working point can be determined and defined mathematically simply with a unique reference point.

In order to be able to adjust the pull point as geometrically precisely as possible, a relative distance between the coupling points of the two bottom links facing the tractor is varied. Here, the two bottom links are each movably connected to the tractor support structure via a side stabilizer. The coupling point between the side stabilizer and the bottom link lies along the length of the bottom link between the two coupling points thereof.

In a further embodiment, the coupling points of the bottom link facing the tractor are coupled to a drive mechanism that can be controlled to vary the relative distance between the two coupling points. This allows technically simple motion control of the bottom links relative to each other to be provided. The drive mechanism (for example, a hydraulic cylinder or an electric motor) is movably coupled to the bottom link(s) by a coupling device (for example, a kinematic arrangement or a kinematic chain).

In order to be able to adjust the pole point with little technical effort, the position of the top link relative to a straight reference line is varied. The straight reference line is aligned in particular parallel to a longitudinal direction or a vehicle horizontal of the tractor. The pole point can then be adjusted technically simply depending on a change in a coupling distance between the straight reference line and the coupling point of the top link facing the tractor. In an embodiment, in the respective position of the top link, a top link angle between the straight reference line and a top link working line is determined and from this a geometric slope of the top link working line is determined. The data can then be related to a bottom link working line in a defined coordinate system in order to determine the point of intersection of the top link working line and the bottom link working line as the pole point.

In another embodiment, the coupling point of the top link facing the tractor is coupled to a drive unit, which can be controlled to vary the coupling distance. This allows technically simple movement control of the top link. The drive unit is designed, for example, as a controllable hydraulic cylinder or electric motor.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 6A shows a schematic plan view of a partially represented powerlift with force components acting thereon, FIG. 6B shows the plan view in accordance with FIG. 6A with a different force load on the powerlift, FIG. 7 shows a schematic plan view of a tractor with geometric details in connection with a working line between the pull point and the working point, FIG. 8 shows a plan view of an embodiment of a powerlift with two bottom links, FIGS. 9A through 9C show an enlarged representation of detail IX according to FIG. 8, with coupling mechanism for varying the relative distance between the two bottom links in different relative positions, FIG. 15A and FIG. 15B show a side view of the support structure of a tractor with two different positions of the pole point.

Corresponding reference numerals are used to indicate corresponding parts in the Figure.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
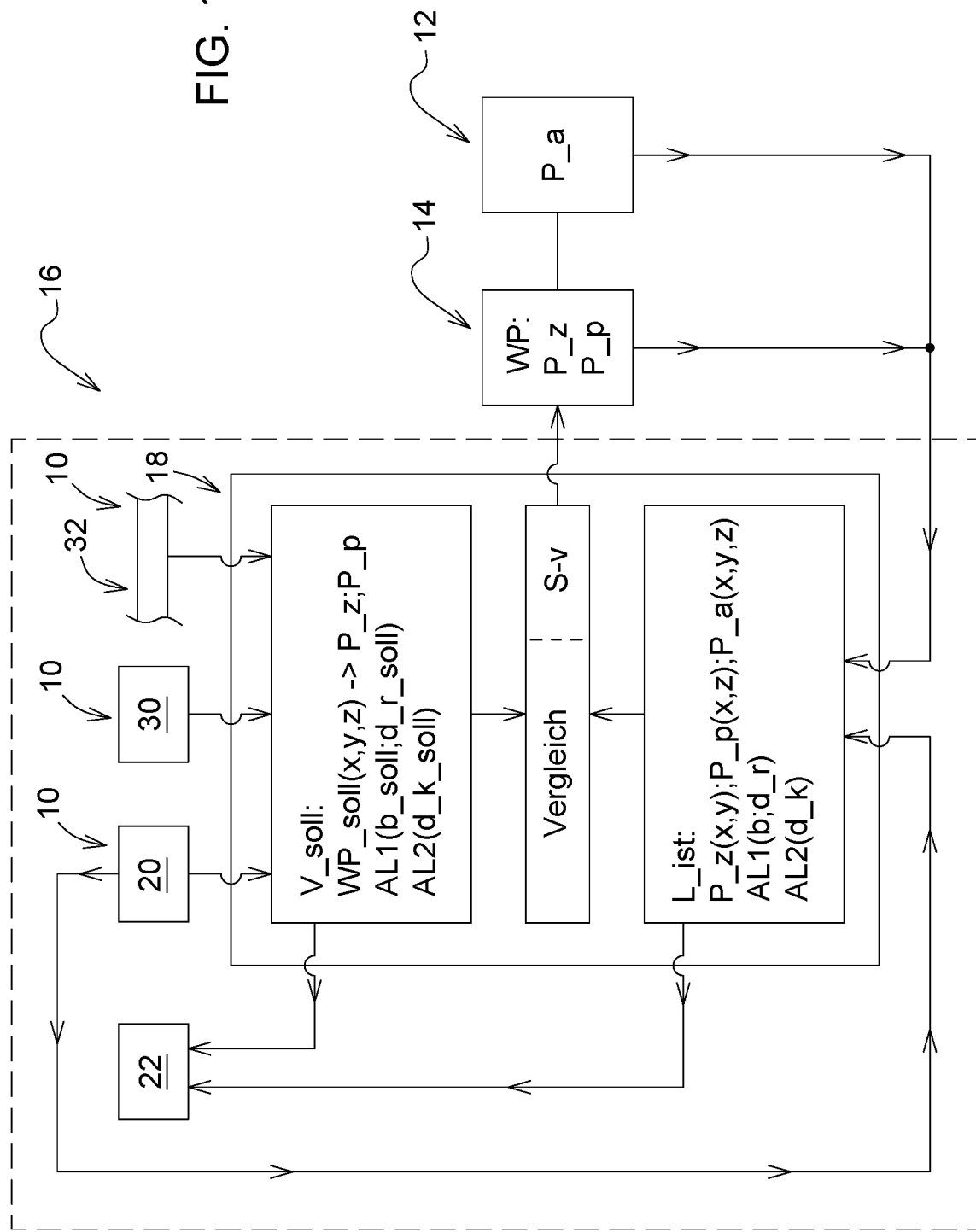
FIG. 1 shows a block diagram with a schematically represented arrangement with components for carrying out the method according to the disclosure.

FIG. 1 shows an arrangement 10 with a plurality of components for controlling the operation of an attachment 12. The attachment 12 is coupled to a tractor 16 via a powerlift 14. The arrangement 10 is disposed at least partially and in particular entirely on the tractor. The arrangement 10 comprises a control unit 18 that contains the subunits required for signal processing, such as a read or write unit, a memory unit and a processor. The control unit 18 may comprise physically separate subunits or may be arranged as a single block on the tractor 16.

Figure 2:
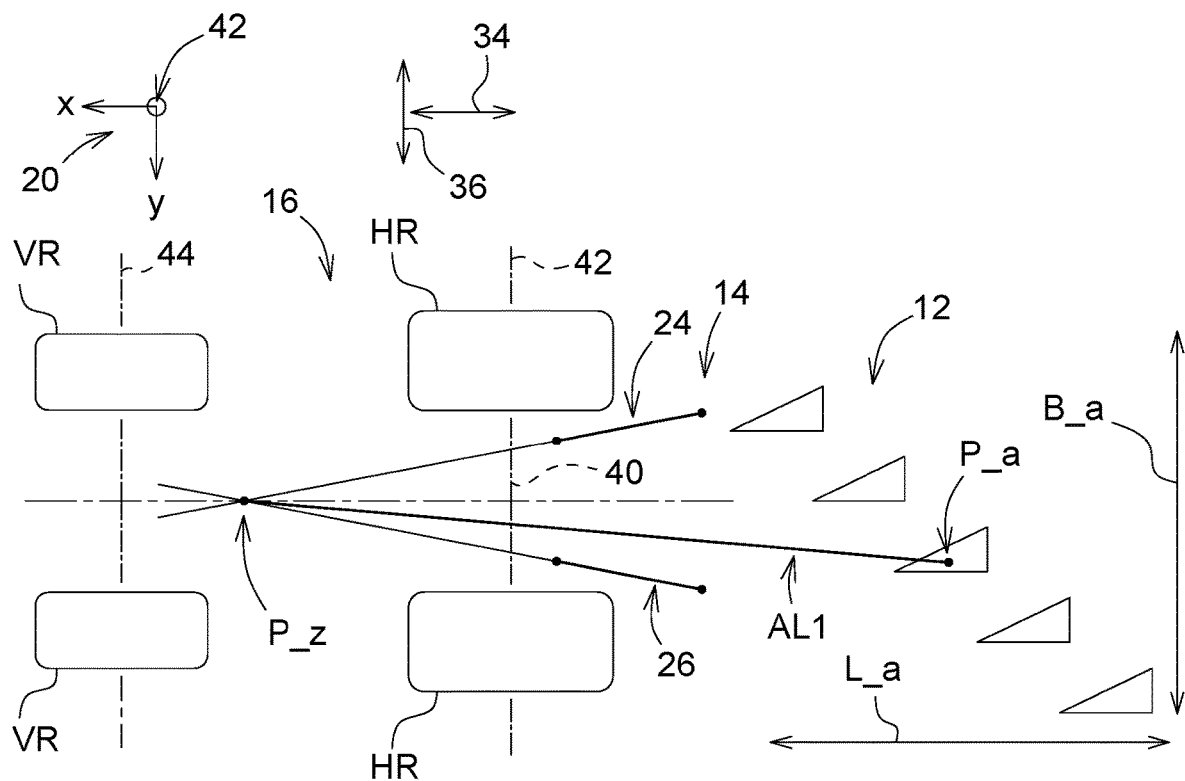
FIG. 2 shows a plan view of a schematically represented tractor-attachment combination.
Figure 3:
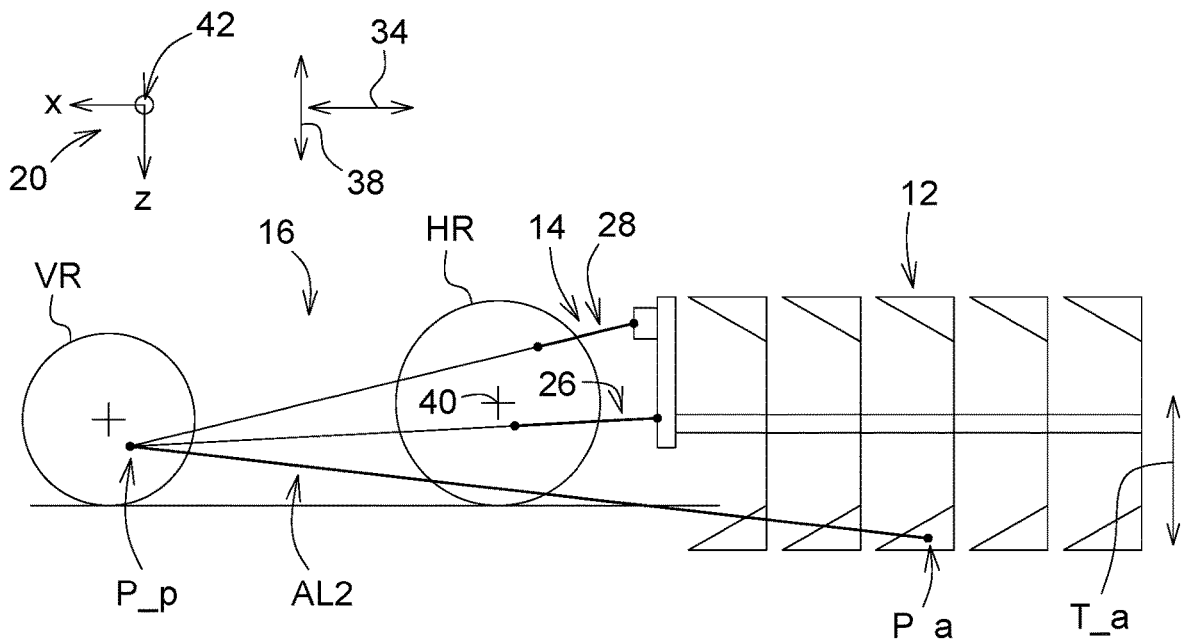
FIG. 3 shows a side view of the tractor-attachment combination according to FIG. 2.

The control unit 18 receives data in the form, for example, of sensor signals from the powerlift 14 or the attachment 12 or data information of the driver or the user via a user interface 20. From the received data, the control unit 18 determines, among other things, the actual position L_ist of two points of action WP that are yet to be described, namely a pull point P_z and a pole point P_p. The current position L_ist is determined in the form of coordinates x, y, z of a defined coordinate system 20 (FIG. 2, FIG. 3). In addition, the current position L_ist of a working point P_a assigned to the attachment 12 can be determined.

Alternatively, the current position L_ist of the working point P_a can be determined before or while the attachment 12 is working by providing specific geometric dimensions of the attachment, specific geometrical distances between the tractor and the attachment as well as specific distances between the attachment and the soil to be processed that are measured by the driver or the user and sent to the control unit 18 via the user interface 20. From the data sent, the control unit 18 can then determine the current position L_ist of the working point P_a.

The determined position L_ist of the point of action WP, i.e., P_z or P_p, and the working point P_a can be signaled to the driver by a display unit 22 of the tractor 16. In addition, the determined position L_ist of the point of action WP can be adjusted automatically depending on the result of a comparison with a setpoint setting V_soll. The setpoint setting V_soll, for example, is a setpoint position WP_soll of the selected point of action WP or a setpoint position of a working line AL1 or AL2. The setpoint setting V_soll is compared with the current position L_ist as part of an algorithm. Depending on the comparison result, adjustment signals S_v may be generated in the control unit 18 that control the powerlift 14 or the two bottom links 24, 26 thereof or the top link 28 thereof to adjust them. This adjustment of the powerlift 14 can thus bring about the automatic implementation of a setpoint setting.

The setpoint setting V_soll may be specified, for example, by the driver or the user via the user interface 20. Alternatively, the setpoint setting V_soll may be automatically defined by a tractor-side control unit 30 or a bus system 32 of the tractor 16. The respective setpoint setting V_soll may optionally be signaled on the display unit 22. The driver or the user can then easily recognize setpoint settings and, if necessary, change them very precisely.

The representation of the current position L_ist and the setpoint position by the setpoint setting V_soll on the display unit 22 is similar to the representation in FIG. 2 and FIG. 3, so that the user has a good overview of the current situation and changes of the selected point of action WP, the working point P_a as well as the working lines AL1 and AL2.

For the determination of the point of action WP, the working point P_a and the working lines AL1, AL2, the already mentioned coordinate system 20 is defined, which is clearly recognizable using FIG. 2 and FIG. 3. The coordinate system 20 has an x-axis, a y-axis, and a z-axis. The x-axis runs parallel to a longitudinal direction 34 of the tractor 16, in particular a vehicle horizontal. The y-axis runs parallel to a transverse direction 36 of the tractor 16, in particular another vehicle horizontal. The z-axis runs parallel to a vertical direction 38 of the tractor 16, in particular a vehicle vertical. The three axes mentioned intersect at a coordinate origin 40 or zero point, which corresponds to a reference point for the position of the point of action WP, the working point P_a and the working lines AL1, AL2. As can be seen in FIG. 2 and FIG. 3, this reference point corresponds to a center point of a rear axle 42 of the tractor 16.

Furthermore, it can be seen in FIG. 2 and FIG. 3 that for the task represented therein the positions of both the pull point P_z and the pole point P_p are located along the longitudinal direction 34 between the rear axle 42 with two rear wheels HR and a front axle 44 with two front wheels VR of the tractor 16. While the first working line AL1 connects the pull point P_z to the working point P_a (FIG. 2), the second working line AL2 connects the pole point P_p to the working point P_a (FIG. 3). The first working line AL1 lies in a plane spanned by the longitudinal direction 34 and the transverse direction 36. The second working line AL2 lies in a plane spanned by the longitudinal direction 34 and the vertical direction 38.

The pull point P_z is the geometric intersection of imaginary extensions of the two bottom links 24, 26 (FIG. 2). The pole point P_p is the geometric intersection of imaginary extensions of the top link 28 and a bottom link 24 or 26.

Figure 4:
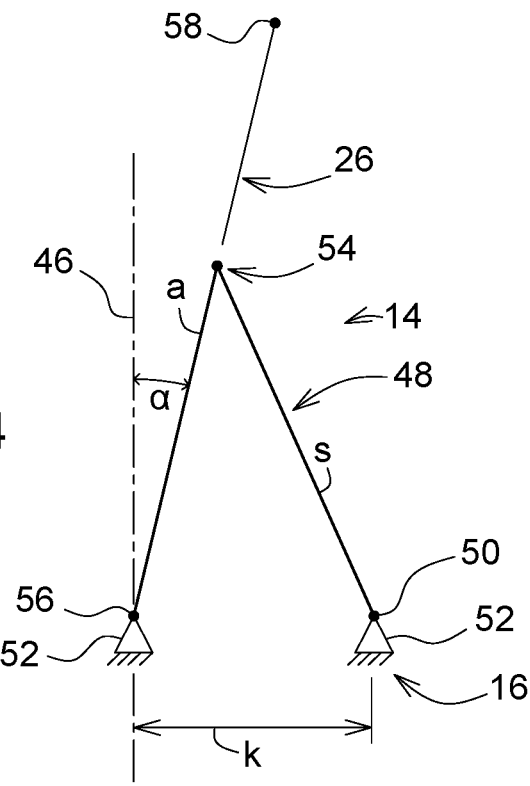
FIG. 4 shows a schematic plan view of a partially represented powerlift of a tractor.
Figure 5:
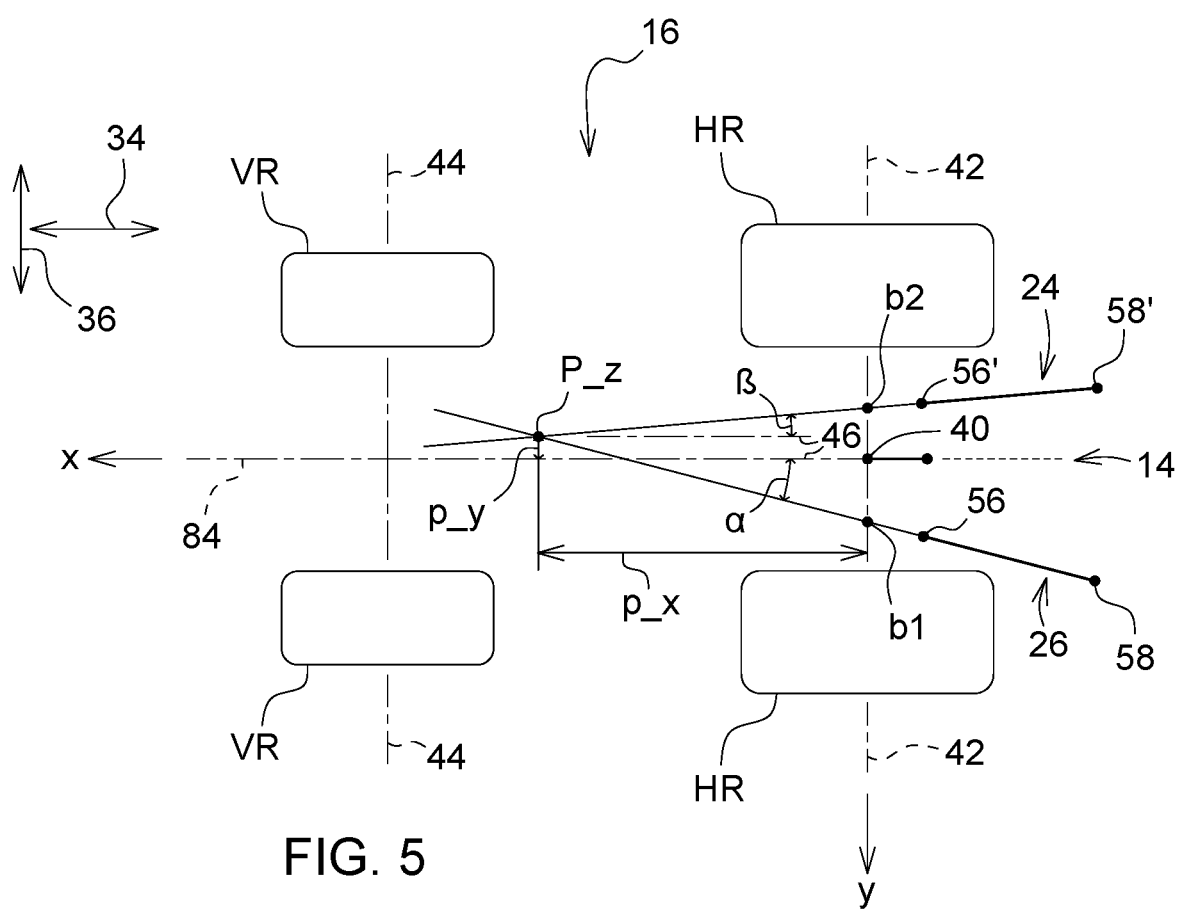
FIG. 5 shows a schematic plan view of a tractor with geometric details for determining the pull point.

Based on FIG. 4 and FIG. 5, it is described how the pull point P_z can be determined technically easily depending on two reference angles α, β. Here, an imaginary extension of the respective bottom link 24, 26 and a straight reference line 46 running parallel to the longitudinal direction 34 form the angle legs of these reference angles α, β. The determination of the reference angles α, β is particularly easy when there are side stabilizers 48 on the powerlift 14, the lengths s of which can be measured. A suitable measuring system for this length measurement is arranged on the side stabilizer itself. The side stabilizer 48 is movably coupled to a coupling point 50 facing the tractor 16 on a support structure 52 of the tractor 16. The side stabilizer 48 is movably connected to the bottom link 26 by a linkage point 54 opposite to the coupling point 50. This linkage point 54 is located between a coupling point 56 facing the tractor 16 and a coupling point 58 of the bottom link 26 facing the attachment 12. The distance a between the coupling point 56 and the linkage point 54 is known. The distance k between the coupling point 50 and the coupling point 56 is also known. The length of the side stabilizer 48 can be measured. Thus, the reference angle α can be determined from the equation $$\sin \alpha = (a^2 + k^2 - s^2)/2ak.$$

For the bottom link 24 with its coupling points 56', 58' and the associated reference angle β, the above equation can be applied accordingly.

If the values of the reference angles are α, β known, the distances b1 and b2 starting from the coordinate origin 40 and running along the transverse direction 36 to the imaginary extensions of the bottom links 24, 26 can also be calculated. From the reference angles α, β and the distances b1, b2, the x-coordinate p_x and the y-coordinate p_y of the pull point P_z result as follows:

$$p\_x = (b2-b1)/(\tan \alpha - \tan \beta), \text{ and}$$

$$p\_y = (\tan \alpha \cdot p\_x) + b1.$$

Based on the calculated reference angles α, β and the determined pull point P_z, it is also technically easy to determine the corresponding working line AL1, which is located in a horizontal plane, without the exact position of the working point P_a having to be known first. For this purpose, forces acting on the coupling points 56, 56' of the bottom links 24, 26 are measured by a suitable measuring system. The measuring system (for example, strain measuring gauges) is integrated in the vicinity of the coupling points 56, 56'. Advantageously, the measurement of the force components F_Lx and F_Rx parallel to the longitudinal direction 34 or parallel to the x-axis of the coordinate system 20 is then sufficient to determine the working line AL1 (FIG. 6A, FIG. 6B).

In FIG. 6A the two bottom links 24, 26 are loaded with tension. From the measured force components F_Lx and F_Rx along the x-axis and the already determined reference angles α, β, the two forces F_L (=F_Lx·cos α), F_R (=F_Rx·cos β) can be calculated and the resultant force F_res can be calculated therefrom. Since the pull point P_z is already known as the intersection of the bottom link extensions, the vector point S can also be determined.

The resultant force F_res according to FIG. 6B is determined analogously to the description in FIG. 6A, wherein in the embodiment according to FIG. 6B the bottom link 26 is loaded with tension and the bottom link 24 is loaded with pressure.

Starting from the determined points P_z and S, the pull line AL1 can be determined, since the working point P_a—seen in the horizontal plane according to FIG. 7—is always on this working line AL1 predetermined by the resultant force F_res. The slope of this line AL1 can be determined, if necessary, from the difference of the x-coordinates and y-coordinates of the points P_z and S, i.e. using S_y and S_x. Furthermore, the line distance b in the transverse direction 36 between the working line AL1 and the coordinate origin 40 or the defined center of the rear axle 42 can be calculated. The respective current value of the line distance b can be signaled via the display unit 22. If b=0, the working line AL1 passes through the center of the rear axle 42, so that the tractor-attachment combination has no side pull or no yaw moment. An optimization of the pull line AL1 adapted to the respective work assignment can be achieved by varying the line distance b or by a suitable change of the position of the pull point P_z. For this purpose, a setpoint setting V_soll may be specified in the control unit 18, for example, in the form of a setpoint value b_soll of the line distance b or in the form of the already mentioned setpoint position WP_soll of the pull point P_z. The setpoint value b_soll may optionally be treated as a variable representing the setpoint slope of the working line AL1.

As already explained, the position of the pull point P_z depends on the position of the two bottom links 24, 26. It involves the relative position of both bottom links 24, 26 in a horizontal path spanned by the longitudinal direction 34 and the transverse direction 36. This relative position can be represented by a relative distance d_r between the two coupling points 56 and 56' (FIG. 8).

According to FIG. 8 the two coupling points 56, 56' are mounted on sections of a bearing shaft 60 facing away from each other. The bearing shaft 60, on the other hand, is mounted on the supporting structure 52. For this purpose, a plate-like bearing base 62 comprises two bearing bars 64 that carry the bearing shaft 60. The bearing base 62 can be firmly connected to the support structure 52 or may be a one-piece component of the support structure 52.

In FIG. 9A the support of the bottom links 24, 26 can be seen in more detail. The coupling points 56, 56' are each movably connected to the bearing shaft 60 by a ball bearing 64 and a bearing sleeve 66 passing through the ball bearing 64. In addition, the coupling points 56, 56' are coupled to drive mechanism 68 that can be controlled to vary the relative distance d_r. In FIG. 9A, the drive mechanism 68 are in the form of a hydraulic cylinder that can be controlled by suitable adjustment signals S_v of the control unit 18. For coupling the coupling points 56, 56' to the drive mechanism 68, coupling mechanism 70 are provided that may be formed differently. The bearing sleeves 66 may also be considered as a component of the coupling mechanism 70. The bearing sleeves 66 are each movably supported by a coupling bar 72 with a coupling link 74, in particular by corresponding link axles 76. The coupling link 74 is mounted on the bearing shaft 60 in an articulated manner by a link axle 78. The drive mechanism 68 shown in FIG. 9A is movably connected via link axles 80 to the coupling link 74 on the one hand and to the support structure 52 on the other hand.

In further embodiments, the drive mechanism 68 according to FIG. 9A may be in the form, for example, of an electric motor (for example, a linear or stepper motor), which then at least in this embodiment drives the link axle 78 that is fixedly connected to the coupling link 74. In this case, the link axle 80 on the coupling link 74 is superfluous.

Figure 9C:
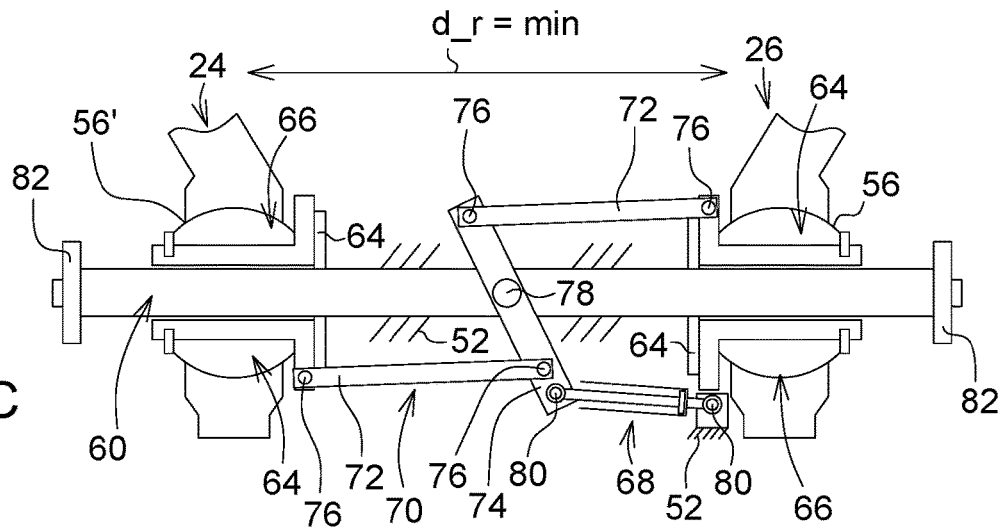

Regardless of their design, the drive mechanism 68 can be controlled by the control unit 18 in order to vary the relative distance d_r between a maximum length (FIG. 9B) and a minimum length (FIG. 9C). Here, the axial mobility of the bearing sleeves 66 is limited by the bearing bars 64 (FIG. 9C) on the one hand and by end stops 82 (FIG. 9B) arranged on the bearing shaft 60 on the other hand.

In the control unit 18, a setpoint setting V_soll, for example, in the form of a setpoint value d_r_soll, may be specified by the relative distance d_r in order to adjust the pull point P_z and thus also the working line AL1. The setpoint value d_r_soll may optionally be treated as a variable representing the setpoint slope of the working line AL1.

The respective relative distance d_r is sent, for example, as a sensor signal to the control unit 18. Here, a rotation rate sensor interacting with the link axle 78 may be used. The sensor signals can also provide information about the current position of the pull point P_z, since the position of the pull point P_z depends on the relative distance d_r.

Figures 11A, 11B:
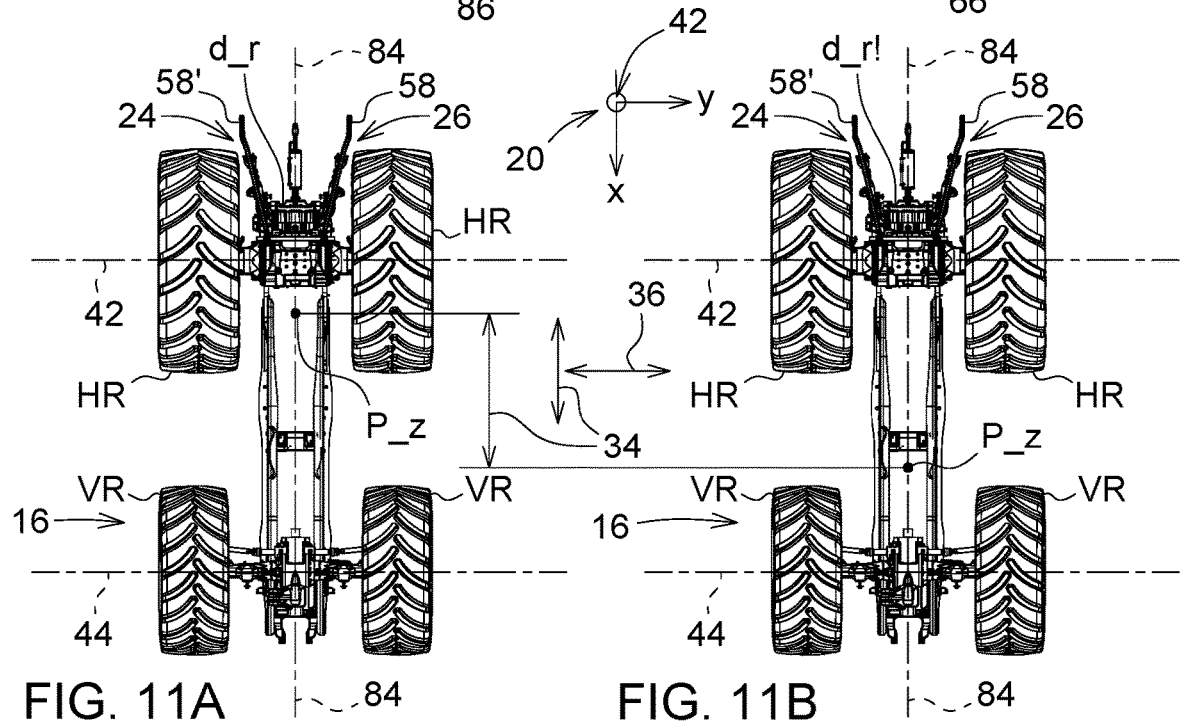
FIG. 11A and FIG. 11B show a plan view of a tractor with two different positions of the pull point.

If the drive mechanism 68 and the coupling mechanism 70 used allow a mirror-symmetrical change in the relative position of both bottom links 24, 26 (FIG. 9A to FIG. 9C), the pull point $P\_z$ in a specific embodiment may only be adjusted along the x-coordinate or along the longitudinal direction 34. In the case of a symmetrical arrangement of the bottom links 24, 26 with respect to a central longitudinal axis 84 and a constant distance of the two coupling points 58, 58' facing the attachment 12 relative to each other in the transverse direction 36, this mechanism that the pull point $P\_z$ is only adjustable along this central longitudinal axis 84 in the longitudinal direction 34. In this case, the position of the pull point $P\_z$ in FIG. 11A corresponds to the minimum relative distance $d\_r$. The position of the pull point $P\_z$ in FIG. 11B corresponds to the maximum relative distance $d\_r$.

Figure 10:
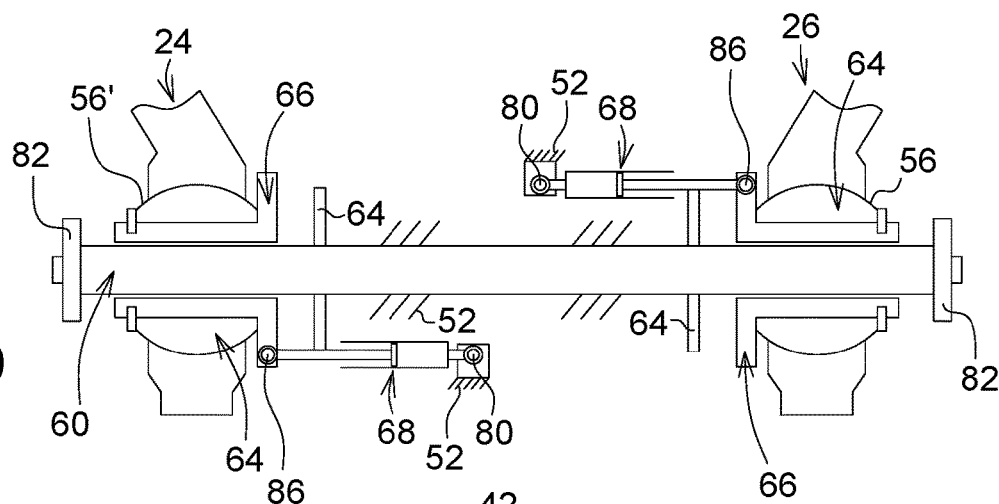
FIG. 10 shows coupling mechanism for varying the relative distance between the two bottom links in a further embodiment.

In FIG. 10 the drive mechanism 68 comprises two separate hydraulic cylinders, which are each directly movably connected to a bearing sleeve 66 via a joint link axle 86. This allows both bottom links 24, 26 to be adjusted independently of each other. Accordingly, the pull point $P\_z$ can be adjusted with respect to the x coordinate and the y coordinate thereof.

As already explained, the position of the pole point $P\_p$ depends on the position of the top link 28 relative to one or both bottom links 24, 26. It is concerned with the relative position in a vertical plane spanned by the longitudinal direction 34 and the vertical direction 38. This relative position can be changed by a different position of the top link 28 with respect to a horizontal straight reference line 88 running parallel to the longitudinal direction 34.

Figure 12:
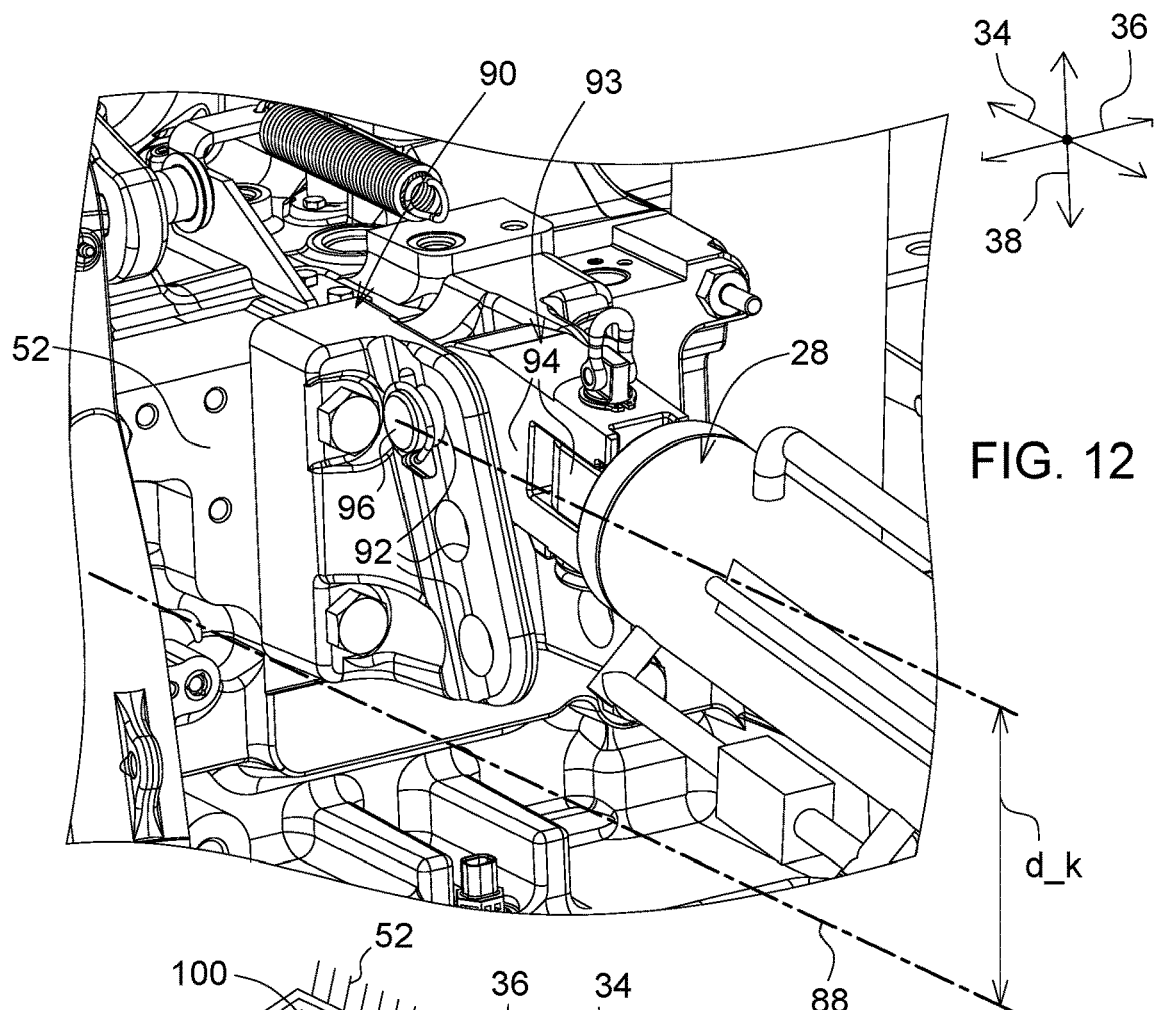
FIG. 12 shows a perspective partial representation of a top link that is linked to a support structure of a tractor.

For this different position or location of the top link 28, traditionally a linkage point 90 may be fixedly connected (for example, screwed) to the support structure 52 with three bearing bushes 92 at different positions along the vertical direction 38 (FIG. 12). In this case, the coupling point 93 of the top link 28 facing the tractor-side linkage point 90 of the top link comprises a cross linkage 94 that is arranged on the selected bearing bush 92 and penetrated by a corresponding bearing bolt 96. This allows the top link 28 to be pivotally coupled to the linkage point 90. For a change of position of the top link 28, the coupling point 93 or cross linkage 94 thereof facing the tractor 16 must conventionally be manually connected to another bearing bush 92 that is present.

Figure 13:
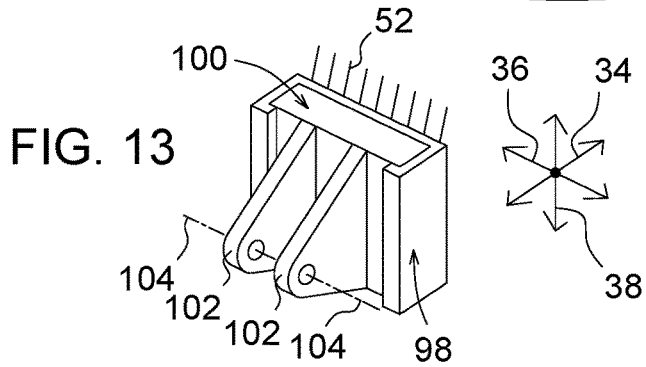
FIG. 13 shows a perspective representation of a movable bearing block for the linkage of the top link.
Figures 14A, 14B:
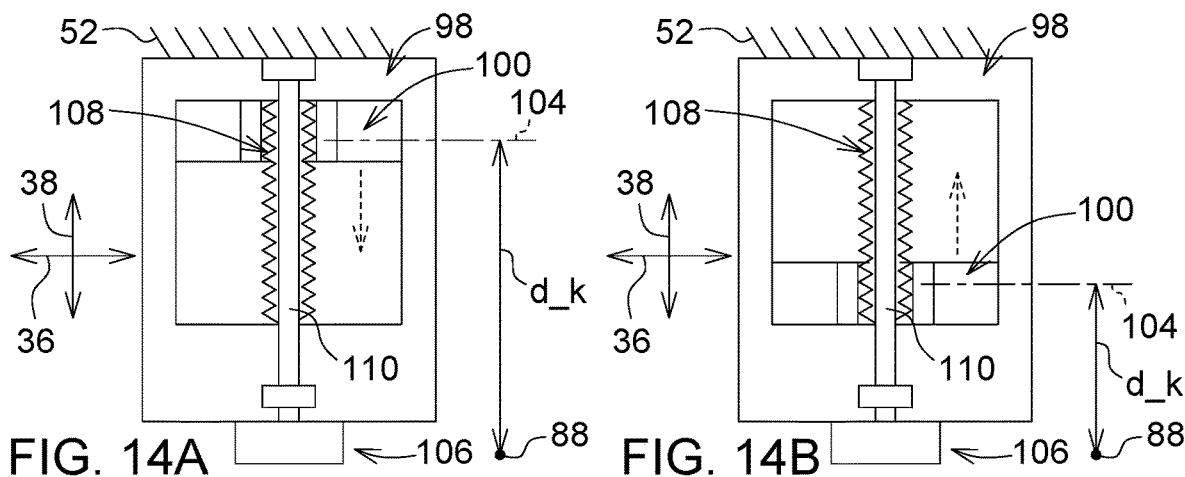
FIG. 14A and FIG. 14B show a schematic side view of the bearing block according to FIG. 13 in two different positions.

This conventional manual positional change is now replaced by a coupling point 93 of the top link 28 that can be driven in the vertical direction 38 (FIG. 13, FIG. 14A, FIG. 14B). For this purpose, the support structure 52 of the tractor 16 carries a shaft-like frame part 98, which accommodates a bearing block 100 in an approximately form-fitting manner. Two parallel booms 102 serve in the vicinity of a pivot axle 104 as a pivotally movable receptacle for the coupling point 93 of the top link 28.

Along the vertical direction 38, the bearing block 100 and thus also the top link 28 that is linked thereto are movable relative to the frame part 98. For this translational movement, a drive unit 106 is provided (for example, a linear motor or a stepper motor or a hydraulic cylinder), the drive movement of which is transferred to the bearing block 100 (FIG. 14A, FIG. 14B). For this purpose, for example, a spindle drive 108 is provided, the spindle rod 110 of which is driven by the drive unit. The spindle rod 110 works together with the bearing block 100 and can move the latter along the vertical direction 38.

In this way, the control unit 18 can generate adjustment signals $S\_v$, with which the drive unit 106 can be controlled. With this control, the bearing block 100 can be moved along the vertical direction 38 between an upper position (FIG. 14A) and a lower position (FIG. 14B). This allows a coupling distance $d\_k$ between the reference line 88 and the coupling point 93 to be varied continuously and automatically. The coupling distance $d\_k$ is largest in FIG. 14A and smallest in FIG. 14B.

The adjustment of the pole point $P\_p$ due to a changed coupling distance $d\_k$ can be seen in FIG. 15A and FIG. 15B. The distance in the vertical direction 38 between the coupling point 58 of the bottom link 26 and a coupling point 112 facing the attachment 12 is constant. With the minimum coupling distance $d\_k$-min, the pole point $P\_p$ is close to the rear axle 42, while with the maximum coupling distance $d\_k$-max the pole point $P\_p$ has been displaced along the longitudinal direction 34 by a distance 114 towards the front axle 44. This allows the x-coordinate and the z-coordinate of the pole point $P\_p$ to be adjustable.

In the control unit 18, a setpoint setting $V\_soll$, for example, in the form of a setpoint value $d\_k\_soll$ of the coupling distance $d\_k$, may be specified in order to adjust the pole point $P\_p$ and thus also to adjust the working line AL2. The setpoint value $d\_k\_soll$ may optionally be treated as a variable representing the setpoint slope of the working line AL2.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for controlling the operation of an attachment that is coupled to a tractor via a top link and two bottom links of a powerlift, comprising:
    selecting a point of action from at least one of a pull point as a geometric intersection of imaginary extensions of both bottom links and a pole point as a geometric intersection of imaginary extensions of the top link and a bottom link;
    determining a position of the selected point of action;
    signaling the determined position of the point of action by a display unit or adjusting the determined position depending on a comparison with a setpoint setting; and
    adjusting the pull point based on a change in a relative distance between the couplings of the two bottom links facing the tractor.

2. The method of claim 1, wherein the determining of the position of the point of action step comprises determining a working line that connects the point of action to a working point of the attachment.

3. The method of claim 2, wherein the working line connects the pull point to the working point and lies in a plane spanned by a transverse direction and a longitudinal direction of the tractor.

4. The method of claim 2, wherein the working line connects the pole point to the working point and lies in a plane spanned by a vertical direction and a longitudinal direction of the tractor.

5. The method of claim 1, further comprising providing the setpoint setting with a setpoint position of the point of action or a setpoint position of a working line connecting the point of action to a working point of the attachment.

6. The method of claim 5, further comprising determining the working point or the working line depending on at least one of a plurality of variables.

7. The method of claim 6, wherein the plurality of variables comprises a working length of the attachment along a longitudinal direction of the tractor, a working width of the attachment along a transverse direction of the tractor, a working depth of the attachment along a vertical direction of the tractor, and a force component acting in the longitudinal direction of the tractor that acts on a coupling point of the bottom link facing the tractor.

8. The method of claim 1, further comprising determining the point of action, the working point, or the working line based on a reference angle that is enclosed by an imaginary extension of the bottom link and a straight reference line.

9. The method of claim 8, wherein the straight reference line runs parallel to a longitudinal direction of the tractor.

10. The method of claim 1, further comprising defining a coordinate system for the determination of the point of action with a coordinate origin corresponding to a reference point.

11. The method of claim 10, wherein the reference point comprises a center point of a rear axle of the tractor.

12. The method of claim 1, further comprising coupling a coupling point of at least one of the bottom links facing the tractor to a drive mechanism.

13. The method of claim 12, wherein the drive mechanism controllably varies the relative distance.

14. The method of claim 1, further comprising adjusting the pole point based on a change of a coupling distance between a straight reference line and the coupling point of the top link facing the tractor.

15. The method of claim 14, further comprising coupling a coupling point of the top link to a drive unit.

16. The method of claim 15, wherein the drive unit controllably varies the coupling distance.

17. A method for controlling the operation of an attachment that is coupled to a tractor via a top link and two bottom links of a powerlift, comprising:
   selecting a point of action from at least one of a pull point as a geometric intersection of imaginary extensions of both bottom links and a pole point as a geometric intersection of imaginary extensions of the top link and a bottom link;
   determining a position of the selected point of action,
   signaling the determined position of the point of action by a display unit or adjusting the determined position depending on a comparison with a setpoint setting; and
   adjusting the pole point based on a change of a coupling distance between a straight reference line and the coupling point of the top link facing the tractor.

18. A method for controlling the operation of an attachment that is coupled to a tractor via a top link and two bottom links of a powerlift, comprising:
   selecting a point of action from at least one of a pull point as a geometric intersection of imaginary extensions of both bottom links and a pole point as a geometric intersection of imaginary extensions of the top link and a bottom link;
   determining a position of the selected point of action,
   signaling the determined position of the point of action by a display unit or adjusting the determined position depending on a comparison with a setpoint setting;
   adjusting the pull point based on a change in a relative distance between the couplings of the two bottom links facing the tractor;
   coupling a coupling point of at least one of the bottom links facing the tractor to a drive mechanism, where the drive mechanism controllably varies the relative distance;
   adjusting the pole point based on a change of a coupling distance between a straight reference line and the coupling point of the top link facing the tractor;
   coupling a coupling point of the top link to a drive unit, where the drive unit controllably varies the coupling distance.

19. The method of claim 18, further comprising defining a coordinate system for the determination of the point of action with a coordinate origin corresponding to a reference point, wherein the reference point comprises a center point of a rear axle of the tractor.

* * * * *